(12) United States Patent
Leonard et al.

(10) Patent No.: US 11,313,356 B2
(45) Date of Patent: Apr. 26, 2022

(54) INTEGRATED SYSTEM AND METHOD FOR SERVICING A COMPONENT OF A WIND TURBINE

(71) Applicant: General Electric Company, Schenectady, NY (US)

(72) Inventors: Jay F. Leonard, Greenville, SC (US); Eric Paul Shelleman, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/001,043

(22) Filed: Aug. 24, 2020

(65) Prior Publication Data

US 2022/0056889 A1 Feb. 24, 2022

(51) Int. Cl.
*F03D 80/50* (2016.01)
*F03D 80/80* (2016.01)
*F03D 13/20* (2016.01)

(52) U.S. Cl.
CPC .......... *F03D 80/50* (2016.05); *F03D 13/20* (2016.05); *F03D 80/88* (2016.05); *F05B 2230/61* (2013.01); *F05B 2230/80* (2013.01); *F05B 2240/60* (2013.01); *F05B 2240/912* (2013.01)

(58) Field of Classification Search
CPC .......... F03D 80/50; F03D 80/88; F03D 13/20; F03D 2230/61; F03D 2230/80; F03D 2240/60; F03D 2240/912
See application file for complete search history.

(56) References Cited

U.S. PATENT DOCUMENTS

| 7,944,079 | B1 | 5/2011 | Signore et al. | |
|---|---|---|---|---|
| 8,108,997 | B2 | 2/2012 | Weaver et al. | |
| 8,500,400 | B2 | 8/2013 | Signore et al. | |
| 10,655,609 | B2 | 5/2020 | Signore et al. | |
| 2009/0261594 | A1* | 10/2009 | Christensen | F03D 80/70 290/55 |
| 2012/0205915 | A1* | 8/2012 | Liingaard | F03D 13/20 290/55 |
| 2014/0037456 | A1* | 2/2014 | Erno | F03D 80/88 416/244 R |

(Continued)

FOREIGN PATENT DOCUMENTS

| CN | 110242513 A | 9/2019 |
|---|---|---|
| EP | 1617075 A1 | 1/2006 |

(Continued)

OTHER PUBLICATIONS

European Search Report for EP Application No. 21191951.9, dated Jan. 18, 2022.

*Primary Examiner* — Sean Gugger
(74) *Attorney, Agent, or Firm* — Dority & Manning, P.A.

(57) ABSTRACT

An integrated repair system for servicing a component within the nacelle of the wind turbine uptower. The repair system includes at least one mounting location integrally formed into a bedplate support frame of the wind turbine and a frame assembly coupled to the bedplate support frame. The frame assembly supports at least one clamp element and at least one jack element. When the gearbox is moved in the nacelle during repair procedures, the repair system supports the main shaft uptower such that the rotor remains installed onto the rotor shaft.

18 Claims, 13 Drawing Sheets

(56) References Cited

U.S. PATENT DOCUMENTS

2018/0283360 A1* 10/2018 Li .................... F03D 80/50
2019/0316569 A1   10/2019 Fenger
2020/0392799 A1* 12/2020 Lloyd ................ E21B 19/12

FOREIGN PATENT DOCUMENTS

EP    1748182  A2   1/2007
ES    2320444  T3   5/2009

* cited by examiner

INTEGRATED SYSTEM AND METHOD FOR SERVICING A COMPONENT OF A WIND TURBINE

FIELD

The present disclosure relates in general to wind turbines, and more particularly to integrated systems and methods for servicing a component within a nacelle of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having one or more rotor blades. The rotor is often coupled to the gearbox via a rotor shaft supported by a main bearing, and, ultimately, to the generator. The main bearing and the gearbox are mounted on a bedplate support frame located within the nacelle. Typically, the bedplate support frame is mounted atop the tower via a yaw bearing. The one or more rotor blades capture kinetic energy of wind using known airfoil principles. The rotor blades transmit the kinetic energy in the form of rotational energy so as to turn the rotor shaft coupling the rotor to the gearbox, or if a gearbox is not used, directly to the generator. The generator then converts the mechanical energy to electrical energy that may be deployed to a power grid.

Typically, the weight of the rotor is supported via the rotor shaft and transmitted to the gearbox, and ultimately to the tower. During the lifecycle of the wind turbine, it may, from time to time, be necessary to decouple the gearbox from the rotor shaft. In such an instance, the weight of the rotor may result in a large upward force at the end of the rotor shaft which is decoupled from the generator. For example, the large upward force may exceed 700 metric tons. Accordingly, decoupling the gearbox from the rotor shaft typically requires the removal of the rotor as well, which is both costly and time-consuming.

In view of the aforementioned, the art is continuously seeking new and improved systems and methods for servicing a component within a nacelle of a wind turbine uptower without necessitating the removal of the rotor or any part thereof.

BRIEF DESCRIPTION

Aspects and advantages of the invention will be set forth in part in the following description, or may be obvious from the description, or may be learned through practice of the invention.

In one aspect, the present disclosure is directed to an integrated repair system for servicing a component within a nacelle of a wind turbine uptower. The wind turbine may include a rotor with at least one rotor blade mounted to a rotatable hub. The rotor may be operably coupled to a gearbox via a rotor shaft supported by at least one main bearing. The repair system may include at least one mounting location integrally formed into a bedplate support frame of the wind turbine. The system may also include a frame assembly having at least one support leg secured to the mounting location(s) and defining a passageway that receives the rotor shaft therethrough. The system may also include at least one clamp element positioned inward of the frame assembly so as to receive the rotor shaft therein and provide a clamping force thereto. Further, the system may include at least one jack element engaged with the frame assembly and the clamp element(s). The jack element(s) being operable with the frame assembly to provide support to and movement of the rotor shaft in at least one direction. When the gearbox is moved in the nacelle during a repair procedure, the repair system may support the rotor shaft uptower such that the rotor remains installed on the rotor shaft.

In an embodiment, the rotor shaft may be coupled to the gearbox via a shrink disk. The shrink disk may define a thickness relative to the rotor shaft. The frame assembly may define a radial-separation distance relative to the rotor shaft which is greater than the thickness defined by the shrink disk. The radial-separation distance may permit the passage of the shrink disk along the rotor shaft between the frame assembly and the rotor shaft while the frame assembly is coupled to the bedplate support frame.

In an additional embodiment, the jack element(s) may include a hydraulic actuator or a screw jack. The screw jack may include a threaded stud extending between a first stud end and a second stud end. The second stud end may define a retention feature and a rounded foot receivable by a corresponding socket of the clamp element(s).

In a further embodiment, the clamp element(s) may include a removable wear layer.

In an embodiment, the mounting location(s) may include a web of the bedplate support frame having at least one boss. The boss(es) may define a hole having a diameter corresponding to a diameter of at least one fastener. Additionally, a coupling portion of the support leg(s) may include an interface having a first portion positioned at a first axial position and a second portion positioned at a second axial position. A distance between the first axial position and the second axial position may correspond to a thickness of the mounting location(s). The first and second portions may each define the through hole for receiving the fastener(s).

In an additional embodiment, the mounting location(s) may also include at least one reinforcing strut oriented to except a maximal load developed by the rotor in response to a wind event.

In a further embodiment, the repair system may also include at least one tensioning-jack element engaged with the frame assembly and oriented to press against the bedplate support frame in order to secure the fasteners within the through hole defined by the mounting location(s) and the interface.

In an embodiment, the mounting location(s) may include a mounting surface having a contour corresponding to a contour of the support leg(s). The mounting surface may define a plurality of fasteners openings for receiving a plurality of threaded fasteners. The plurality of threaded fasteners may be configured within the corresponding plurality of fasteners openings.

In an additional embodiment, the repair system may also include a pin carrier tray having a support surface extending between a first tray end and a second tray end. The first tray end may be removably coupled to the support leg(s). The repair system may also include a screw feed assembly operably coupled to the second tray end and oriented to move the fastener(s) in an axial direction so as to couple or decouple the frame assembly and the bedplate support frame.

In a further embodiment, the repair system may also include a suspension strap coupled to the frame assembly and configured to pass between the rotor shaft and the bedplate support frame so as to counter a moment of the rotor shaft.

In an embodiment, the repair system may also include at least one gearbox-push element. The gearbox-bushing element may have a first end received in a recess defined by the frame assembly and a second end oriented to exert an axial force upon the gearbox.

In an additional vitamin, the repair system may also include an axial support element having a first end coupled to the frame assembly and a second end positioned embodiment to react off of a gearbox support system.

In another aspect, the present disclosure is directed to a method for servicing a component within a nacelle of a wind turbine uptower. The wind turbine may have a rotor with at least one rotor blade mounted to a rotatable hub. The rotor may be operably coupled to a gearbox via a rotor shaft supported by at least one main bearing. The method may include receiving the rotor shaft in a passage defined by the frame assembly. The method may also include securing support leg(s) of the frame assembly to a mounting location (s) integrally formed into a bedplate support frame of the wind turbine. The method may also include positioning the clamp element(s) inward of the frame assembly so as to receive the rotor shaft therein and provide a collective force thereto. The method may also include advancing the jack element(s) operably coupled to the clamp element(s) and the frame assembly to position the clamp element(s) in contact with the rotor shaft. Additionally, the method may include decoupling the rotor shaft from the gearbox. The method may also include receiving, with the frame assembly, a vertical load developed by the rotor shaft in response to the supported rotor. Further, the method may include transmitting the received vertical load to the bedplate support frame via the frame assembly and servicing the component of the wind turbine. It should be understood that the system may further include any of the additional steps and/or features described herein.

In yet another aspect, the present disclosure is directed to a wind turbine. The wind turbine may include a tower, a nacelle mounted atop the tower, and a rotor mounted to the nacelle. The rotor may include a rotatable hub having the rotor blade(s) secured thereto. The wind turbine may also include a rotor shaft operably coupling the rotor to a gearbox positioned within the nacelle. The wind turbine may also include at least one main bearing supporting the rotor shaft and a bedplate support frame positioned within the nacelle and supporting the main bearing and the gearbox. Additionally, the wind turbine may include an integrated repair system for servicing a component within the nacelle. It should be understood that the system may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
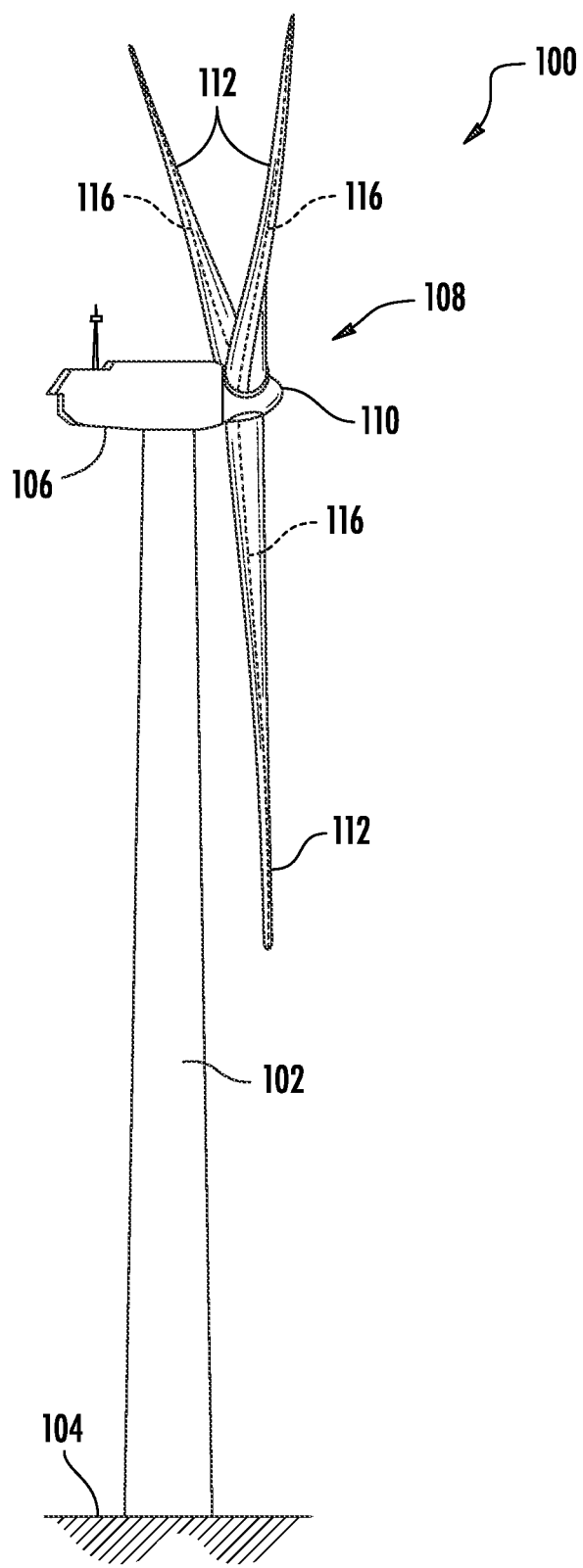
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to an integrated repair system which permits the servicing of a component within a nacelle of a wind turbine uptower without requiring the removal of a rotor or the rotor blades attached thereto. Accordingly, the integrated repair system may include a frame assembly, or yoke, which is configured to resist a load at one end of a rotor shaft resulting from the weight of the rotor coupled to the other end of the rotor shaft. The frame assembly may be coupled through the bedplate support frame of the wind turbine in order to transfer the load from the rotor shaft to the bedplate support frame, and ultimately to the tower of the wind turbine. Accordingly, the integrated repair system may include at least one mounting location which is integrally formed into the bedplate support frame. The mounting location(s) may be formed simultaneously with the manufacturing of the bedplate support frame and may be configured to exclusively support the frame assembly. In other words, the mounting location(s) may be an ever-present feature of the bedplate support frame and may not intended to support any other component of the wind turbine. As such, coupling the frame assembly to the bedplate support frame may be accomplished without the removal of other components of the wind turbine or the addition of an ad hoc support element, such as a crossbeam spanning an opening in the bedplate support frame.

In order to maintain or gain the alignment of the rotor shaft, the frame assembly of the integrated repair system may include at least one clamp element positioned inward of the frame assembly. The clamp element(s) may have a profile which is curved to correspond to the profile of the rotor shaft. At least one jack element may be engaged with the frame assembly and the clamp element(s). The jack element(s) may provide support and movement for the clamp element(s), and, ultimately, the rotor shaft. The jack element(s) may, for example, be a screw jack or a hydraulic jack. Accordingly, the upward, vertical load at the end of the rotor shaft may be transmitted from the rotor shaft through the clamp element(s) and the attached jack element(s) to the frame assembly. From the frame assembly, the load may be transmitted to the bedplate support frame via the mounting location(s) and on to the tower. With the load being transferred to the tower via the integrated repair system, the rotor shaft and the gearbox may be decoupled so as to permit servicing or repair of a component uptower without necessitating the removal of the rotor or any component thereof.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106 mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

Figure 2:
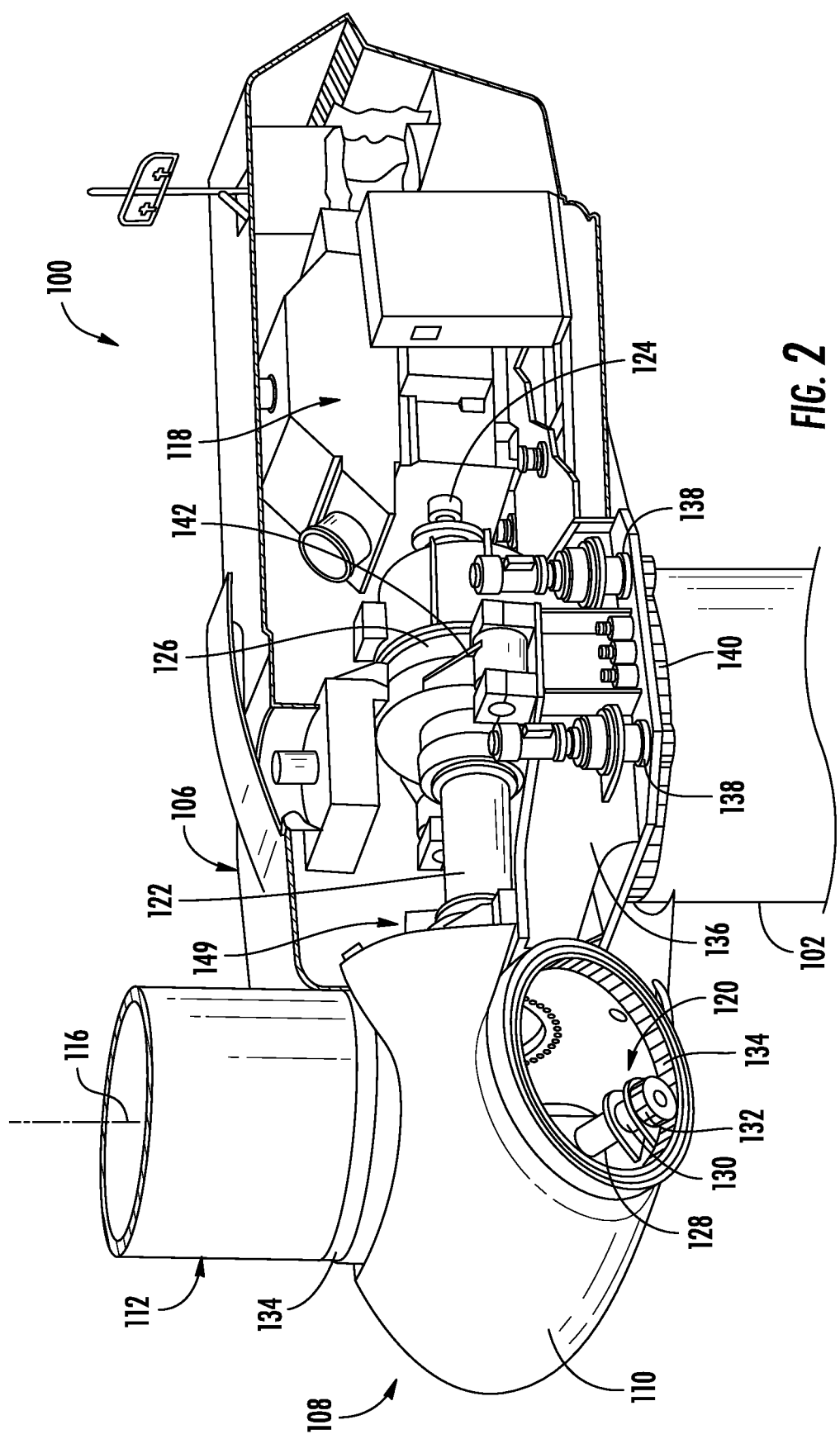
FIG. 2 illustrates a perspective view of one embodiment of a simplified, internal view of one embodiment of a nacelle of a wind turbine according to the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a generator shaft 124 of the generator 118 through a gearbox 126 connected to a bedplate support frame 136 by a gearbox support system 142. The coupling of the rotor shaft 122 to the gearbox 126 may be accomplished via a shrink disk 146. As is generally understood, the rotor shaft 122 may provide a low speed, high torque input to the gearbox 126 in response to rotation of the rotor blades 112 and the hub 110. The gearbox 126 may then be configured to convert the low speed, high torque input to a high speed, low torque output via a plurality of gears 148 in order to drive the generator shaft 124 and, thus, the generator 118. It should be appreciated that the rotor shaft 122 may be considered to be a main shaft or a low-speed shaft and that the generator shaft 124 may be considered to be a high-speed shaft.

Each rotor blade 112 may also include a pitch adjustment mechanism 120 configured to rotate each rotor blade 112 about its pitch axis 116. Further, each pitch adjustment mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade 112 about the pitch axis 116. Similarly, the wind turbine 100 may include one or more yaw drive mechanisms 138 communicatively coupled to the controller 114, with each yaw drive mechanism(s) 138 being configured to change the angle of the nacelle 106 relative to the wind (e.g., by engaging a yaw bearing 140 of the wind turbine 100).

Referring now to FIGS. 3-12, multiple embodiments of the integrated repair system (system) 300 according to the present disclosure are illustrated. As shown particularly in FIG. 3, the system 300 may include a frame assembly 302 configured to facilitate a repair procedure while the weight of the rotor 108 provides a downward, vertical load ($L_1$) on an end of the rotor shaft 122. The frame assembly 302 may include at least one support leg 304. The support leg(s) 304 may be coupled to the bedplate support frame 136 of the wind turbine 100 so as to transfer a load ($L_2$) thereto. Accordingly, the bedplate support frame 136 may include at least one mounting location 306. The bedplate support frame 136 may be configured to securely engage and support the support leg(s) 304. When secured to the bedplate support frame 136, the frame assembly 302 may define a passageway 308 that receives the rotor shaft 122 therethrough. Additionally, the system 300 may include at least one clamp element 310 positioned inward of the frame assembly 302 so as to receive the rotor shaft 122 therein and provide a clamping force thereto. In a further embodiment, the system 300 may also include at least one jack element 312. The jack element(s) 312 may be engaged with the frame assembly 302 and the clamp element(s) 310. The jack element(s) 312 may provide support to, and movement of, the rotor shaft 122 in at least one direction. It should be appreciated that when the gearbox 126 is moved following the installation of the system 300 in the nacelle during a repair procedure, the system 300 may support the rotor shaft 122 uptower. It should further be appreciated that the support of the rotor shaft 122 uptower may permit the rotor 108 to remain installed onto the rotor shaft 122 throughout the repair procedure.

Figure 5:
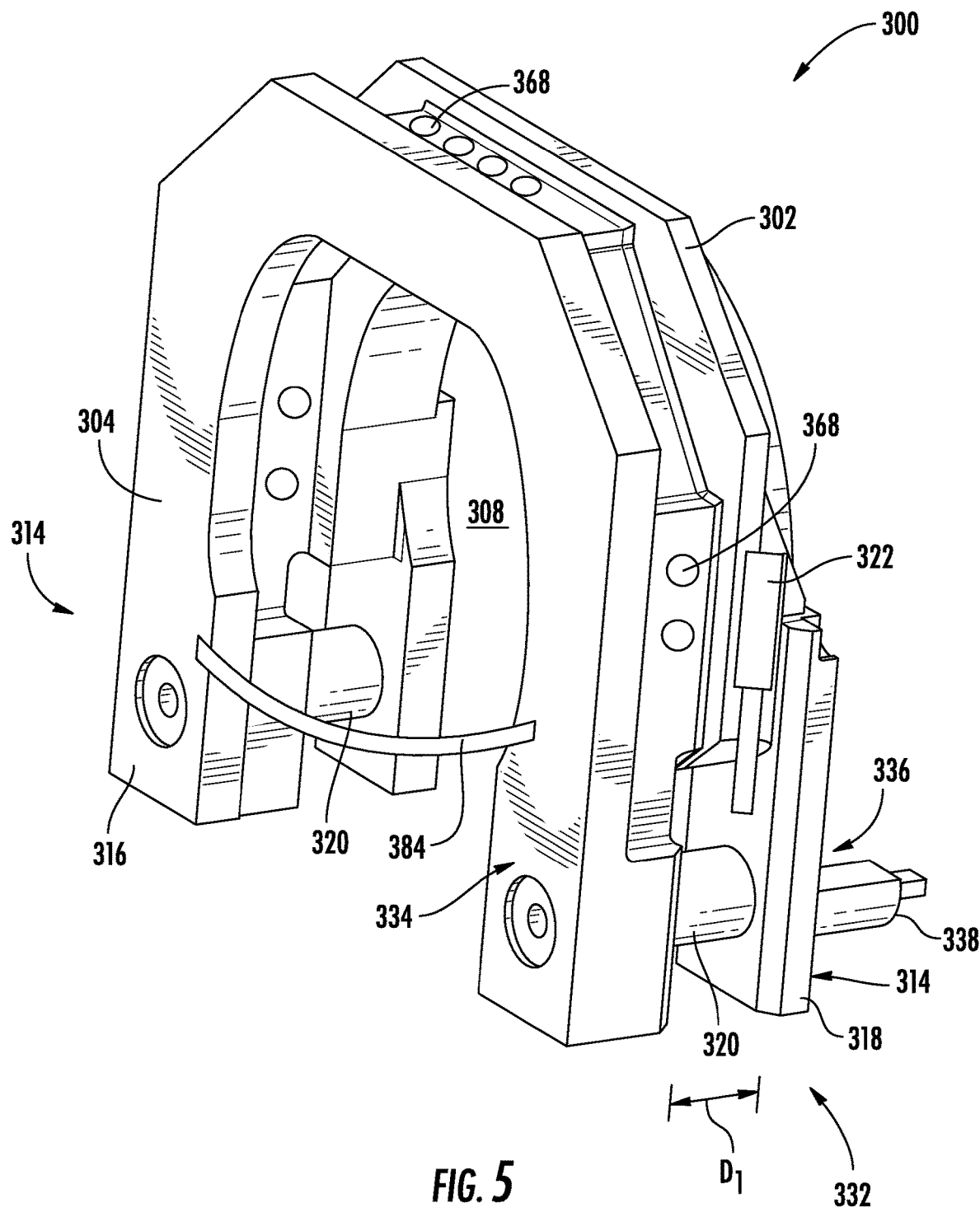
FIG. 5 illustrates a perspective view of a frame assembly according to the present disclosure.
Figure 9:
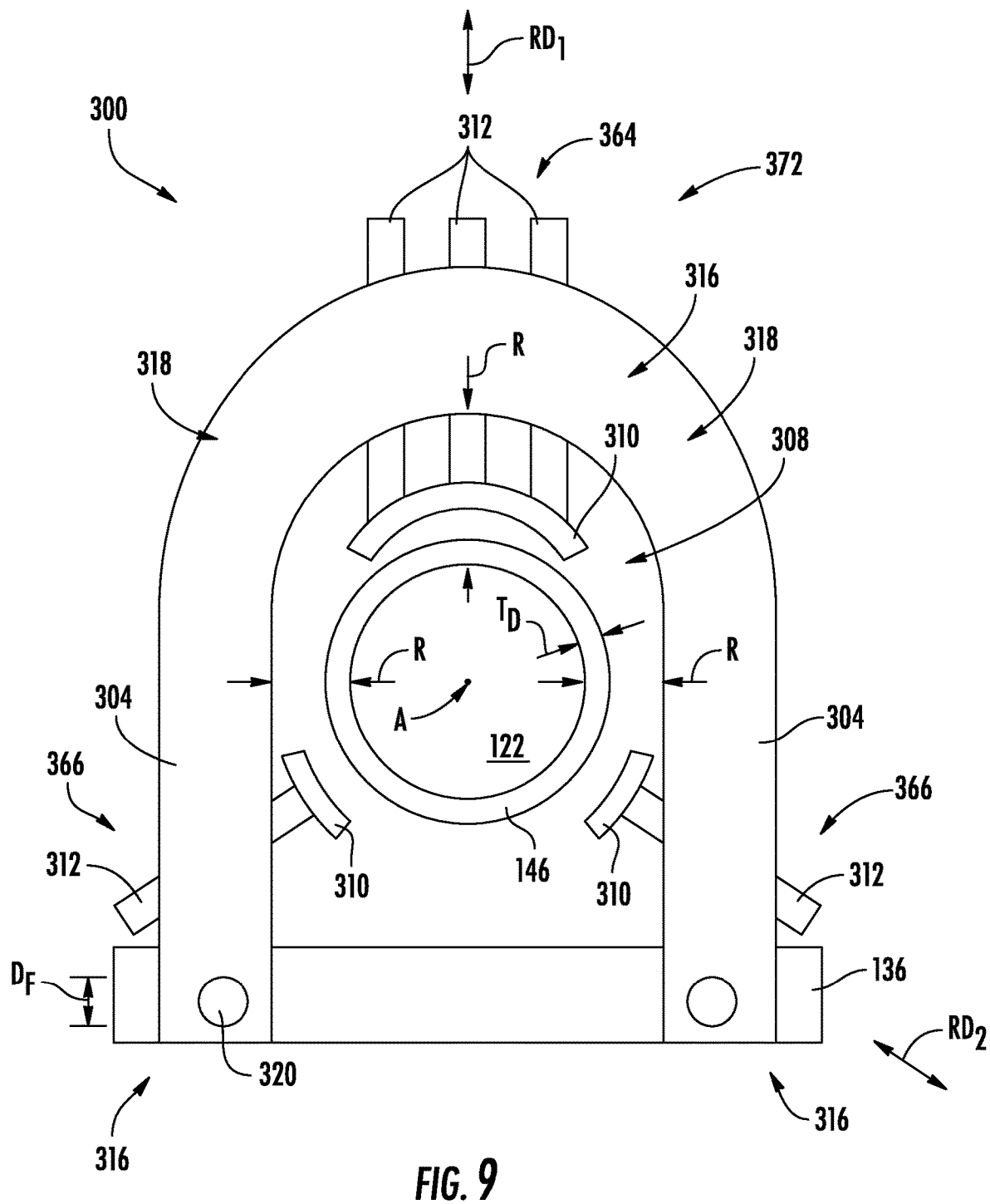
FIG. 9 illustrates an axial view of an embodiment of the integrated repair system according to the present disclosure.
Figure 12:
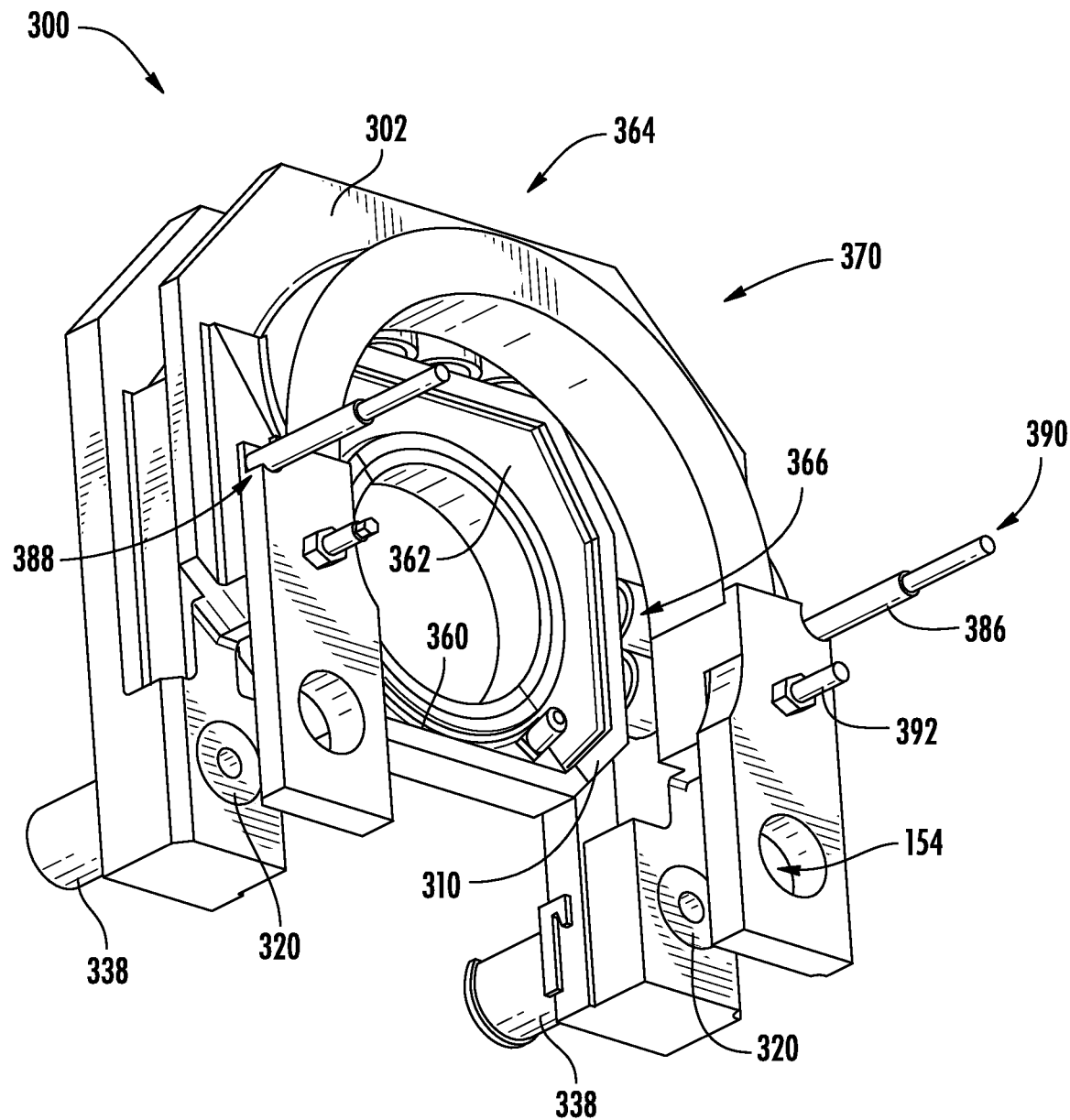
FIG. 12 illustrates a perspective view of the integrated repair system according to the present disclosure.

In an embodiment, such as particularly depicted in FIGS. 5, 9, and 12, the frame assembly 302 may have a generally U-shaped body so as to receive the rotor shaft 122 therethrough. In an embodiment, the frame assembly 302 may be a unitary structure. The support leg(s) 304 may define a coupling portion 314 at both a first leg end 316 and a second leg end 318. In an embodiment, the first and second leg ends may be coupled to the mounting locations 306.

As depicted in FIG. 9, in an embodiment, the frame assembly 302 may include at least two support legs 304 and a crossmember therebetween. In such an embodiment, each support leg 304 may define a coupling portion 314 at the respective first leg ends 316. The respective second leg ends 318 may be coupled to the crossmember.

It should be appreciated that in further embodiments, the frame assembly 302 may have any other suitable shapes. For example, in an embodiment, the frame assembly 302 may be generally L-shaped and have a single coupling portion 314 secured to a single mounting location 306. In a further embodiment, the frame assembly 302 may be generally L-shaped and have a single coupling portion 314 secured to a single mounting location 306 and an additional support point with a component of the wind turbine 100. In an additional embodiment, the frame assembly 302 may be generally triangular and have a vertex vertically aligned with an axis (A) of the rotor shaft 122.

Figure 6:
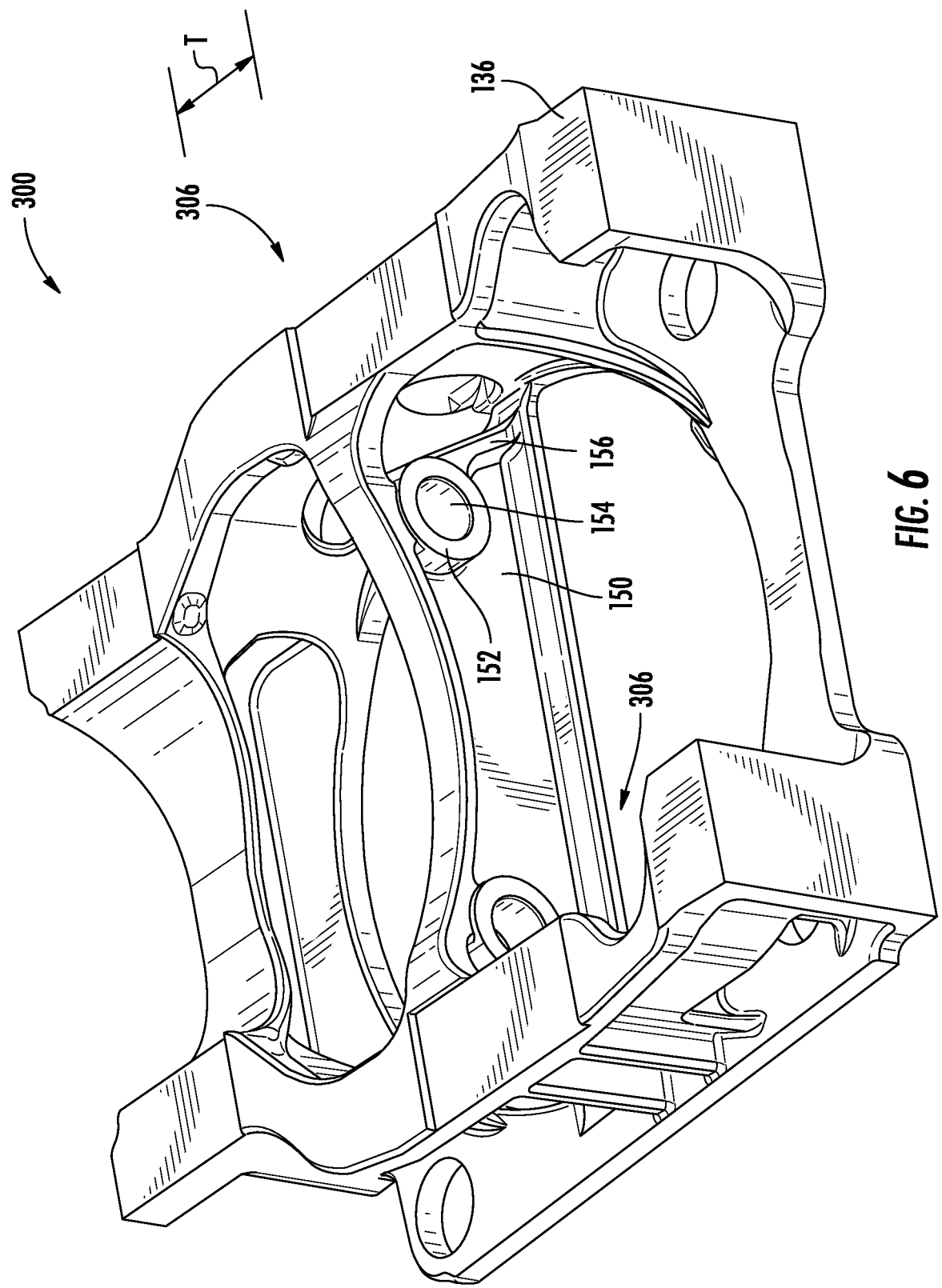
FIG. 6 illustrates a perspective view of an embodiment a bedplate support frame according to the present disclosure.
Figure 7:
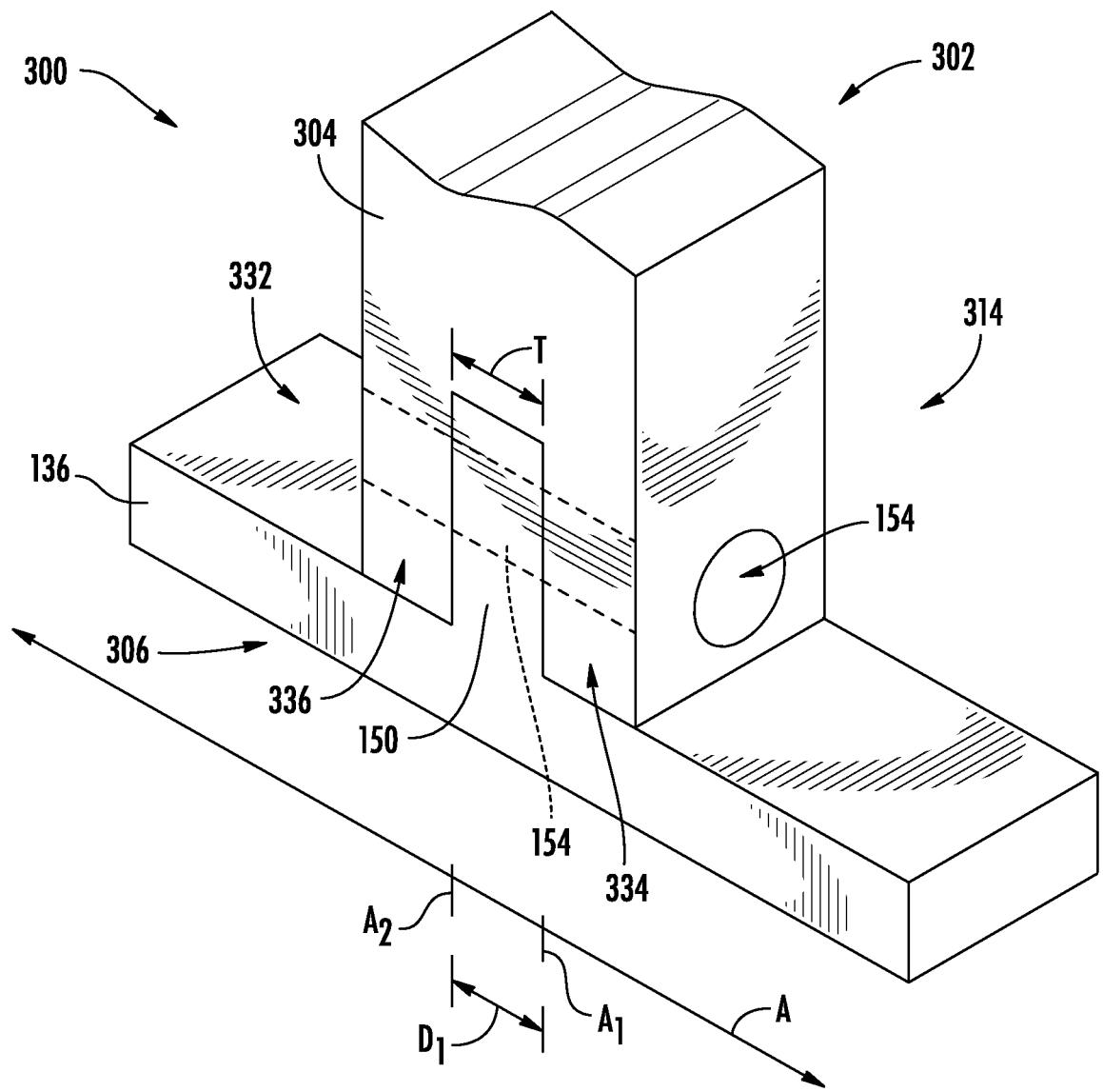
FIG. 7 illustrates a close-up, cross-sectional view of an embodiment of an interface between the assembly and the bedplate support frame according to the present disclosure.

Referring now to FIGS. 6 and 7, in an embodiment, the mounting location(s) 306 may be a dedicated feature of the bedplate support frame 136. Accordingly, in an embodiment, the mounting location(s) 306 may include a web 150 of the bedplate support frame 136. The web 150 may, in an embodiment, be formed with at least one boss 152. The boss(es) 152 may define a through hole 154. In an embodiment, the through hole 154 may have a diameter which corresponds to a diameter ($D_F$) of at least one fastener 320.

In an embodiment, the fastener(s) 320 may be a pin, a dowel, a rod, or other suitable body having a sufficient shear strength to transfer the upward vertical load ($L_2$) from the frame assembly 302 to the bedplate support frame 136. For example, in an embodiment, the fastener(s) 320 may be a shear pin having a shear strength which is greater than 500 metric tons (e.g., greater than 1,500 metric tons). In an embodiment, the system 300 may include two fasteners 320. By utilizing only two fasteners 320 to secure the frame assembly 302 to the bedplate support frame 136, the load path and load sharing of the system 300 may be more predictable and/or controllable than in an embodiment employing more than two fasteners 320.

Referring again to FIGS. 4 and 5, in an embodiment wherein, the mounting location(s) 306 includes the through hole 154 for receiving the fastener(s) 320, the system 300 may include at least one tensioning-jack element 322. The tensioning jack element(s) 322 may be engaged with the frame assembly 302 and oriented to press against the bedplate support frame 136. In other words, the tensioning jack element(s) 322 may be positioned to exert a vertical force on the bedplate support frame 136 and the frame assembly 302. The tensioning-jack element(s) 322 may, thus, be employed to secure the fastener(s) 320 within the through hole 154. In an embodiment, at least one tensioning-jack element(s) 322 may be associated with each mounting location(s) 306 of the system 300.

Figure 3:
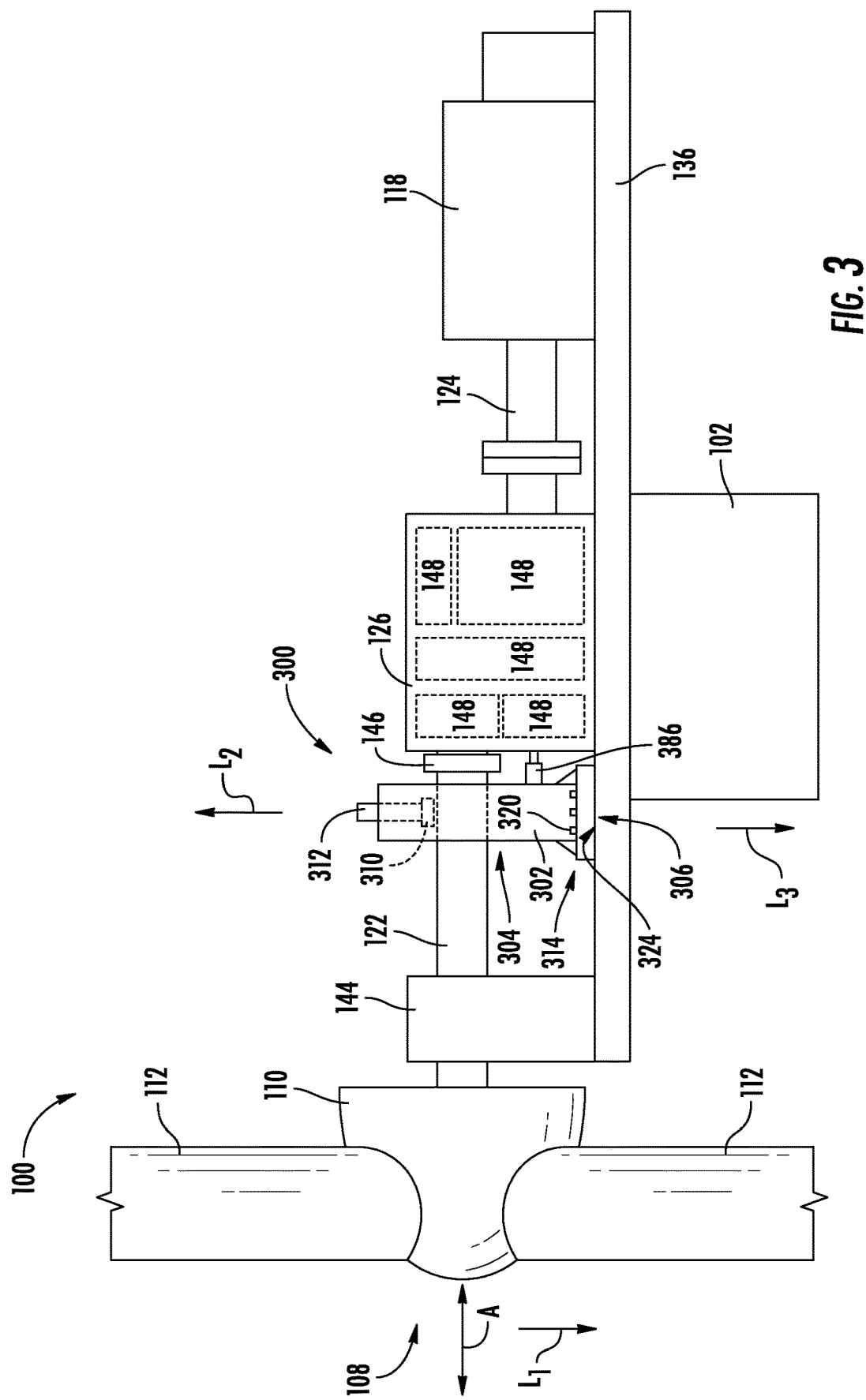
FIG. 3 illustrates a simplified side view of one embodiment of a drivetrain of the wind turbine with an installed integrated repair system according to the present disclosure.
Figure 8:
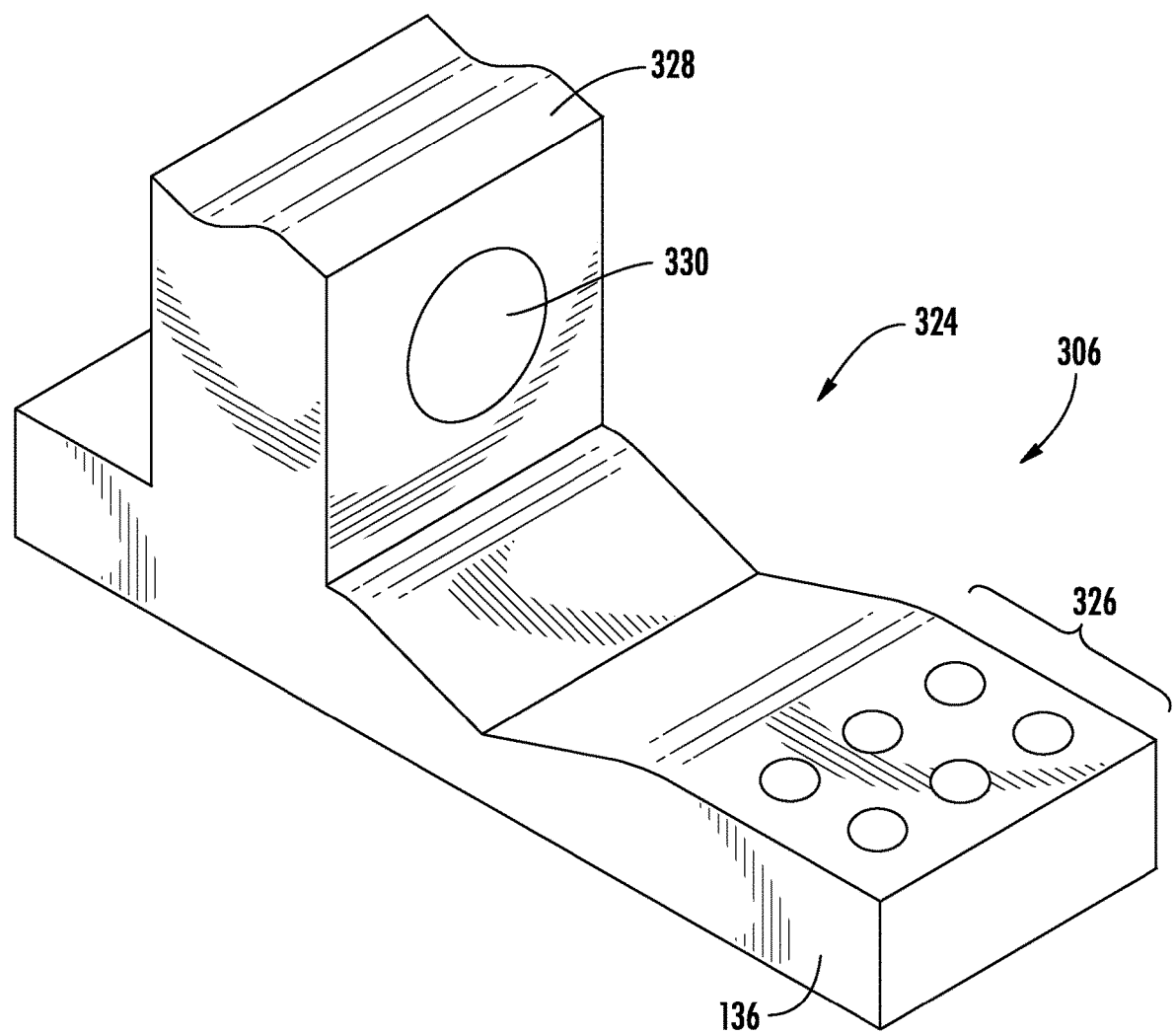
FIG. 8 illustrates a close-up, cross-sectional view of an embodiment of an interface between the assembly and the bedplate support frame according to the present disclosure.

As depicted in FIGS. 3 and 8, the mounting location(s) 306 may include a mounting surface 324. In certain embodiments, the mounting surface 324 may have a contour corresponding to a contour of the support leg(s) 304. For example, the mounting surface 324 and the corresponding contour of the support leg(s) 304 may be formed with a plurality of angles, curves, recesses/protrusions, and/or planar surfaces oriented to facilitate the load transfer between the frame assembly 302 and the bedplate support frame 136.

In an embodiment, the mounting surface 324 may define a plurality of fastener openings 326 configured to receive a corresponding plurality of fasteners 320. Each fastener 320 may be configured as threaded fasteners, such as a bolt or a screw. For example, in an embodiment, the fastener openings 326 may be threaded such that the fasteners 320 may interface with the fastener openings 326 to secure the coupling portion(s) 314 to the mounting location(s) 306. In an additional embodiment, the fastener openings 326 may be formed without threads and may permit a portion of each fastener of the plurality of fasteners 320 to extend beyond the bedplate support frame 136. In such an embodiment, the fasteners 320 may be secured in the fastener openings 326 via a securing element, such as a nut, and may form a through-bolt connection.

In an embodiment, such as depicted in FIG. 8, the mounting location(s) 306 may include both the mounting surface 324 defining the fastener openings 326 and a protrusion 328 defining a pin recess 330. In such an embodiment, the fastener openings 326 may be configured to receive the fasteners 320 configured as threaded fasteners. Further, the pin recess 330 may be configured to receive an additional fastener(s) 320 configured as a pin.

In an embodiment, the mounting location(s) 306 may also include at least one reinforcing strut 156. The reinforcing strut 156 may be oriented to support a maximal anticipated load when the frame assembly 302 is secured to the bedplate support frame 136. For example, the loads generated by the rotor 108 in response to a wind event may vary based on the orientation of the parked rotor blades 112 and the intensity of the wind event. Accordingly, the loads generated by the rotor blades 112 in each of the possible parked orientations may be modeled across the wind range under which the system 300 may be employed. The model may forecast, based on each of the computed load vectors, a maximal load vector required to be transferred by the frame assembly 302 to the bedplate support frame 136. The reinforcing strut 156 may be sized and/or oriented to facilitate the transfer of the maximal modeled load through the bedplate support frame 136 to the tower 102 without deformation of the bedplate support frame 136.

It should be appreciated that the dedicated features of the mounting location(s) 306 facilitate the coupling of the frame assembly 302 without requiring the disassembly or disturbing of key bolted joints securing other components within the nacelle 106. Additionally, it should be appreciated that the dedicated features of the mounting location(s) 306 may facilitate a highly-integrated coupling resulting in an efficient load transfer from the frame assembly 302 to the bedplate support frame 136, and thereby facilitating a relatively compact design than may be achievable using known approaches. The highly integrated nature of the system 300 may result in a minimal disruption to personnel access, improvements in task ergonomics, and a relatively rapid system deployment, resulting in decreased repair times. It should be appreciated that the key bolted joints may include couplings associated with components of the wind turbine 100 which are directly associated with the operations of the wind turbine 100, such as the main bearing 144, the gearbox 126, yaw drive mechanisms 138, pitch adjustment mechanisms 120, and/or the electrical system. In contrast, non-key joints may include couplings related to serviceability and/or technician safety, such as ladders, panels, gantries, shields, and/or cable routings.

Referring now to FIGS. 5 and 7, in an embodiment, the coupling portion(s) 314 of the support leg(s) 304 may include a first portion 334 positioned at a first axial position ($A_1$) and a second portion 336 positioned at a second axial position ($A_2$). Thus, as shown, a distance ($D_1$) between the first axial position ($A_1$) and a second axial position ($A_2$) may correspond to a thickness (T) of the mounting location(s)

306. In an embodiment, the thickness (T) may correspond to the combined thickness of the web 150 of the bedplate support frame 136 and the boss(es) 152. For example, in an embodiment, the coupling portion (s) 314 of the support leg (s) 304 may be a straddle interface 332. In an embodiment, the first and second portions 334, 336 may each define the through hole 154 for receiving the fastener(s) 320.

Figure 4:
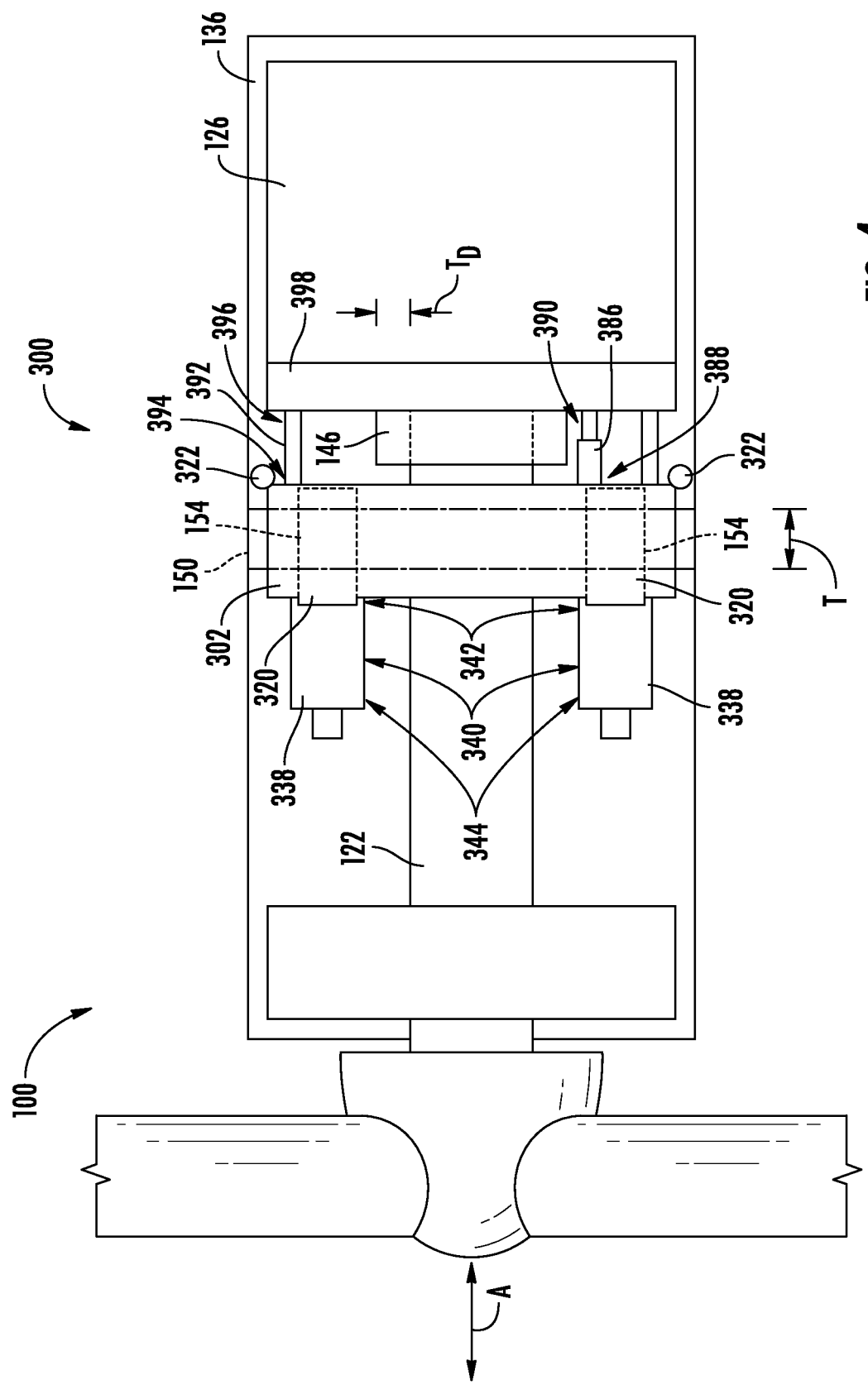
FIG. 4 illustrates a simplified overhead view of one embodiment of a portion of a drivetrain of the wind turbine with an installed integrated repair system according to the present disclosure.

As depicted in FIGS. 4, 5, and 12, in an embodiment, the system 300 may include a pin carrier tray 338. The pin carrier tray 338 may have a support surface 340 extending between a first tray end 342 and a second tray end 344. The support surface 340 may be configured to support the fastener(s) 320 when the frame assembly 302 is decoupled from the bedplate support frame 136. For example, in an embodiment, the support surface 340 may be formed as a hollow, semi-cylinder having a radius corresponding to a radius of the fastener(s) 320 so as to retain the fastener(s) 320 therein. It should be appreciated that the shear strength of the fastener(s) 320 required to react the upward vertical load ($L_2$) may necessitate a fastener size and/or weight which exceeds a lift/move capability of wind turbine repair technicians.

In an embodiment, the first tray end 342 may be removably coupled to the support leg(s) 304. Accordingly, the pin carrier tray 338 may be coupled to the frame assembly 302 while supporting the fastener(s) 320 and may be decoupled from the frame assembly 302 following the insertion of the fasteners 320 into the through hole 154.

In an embodiment, the pin carrier tray 338 may also include a screw feed assembly 346 coupled to the second tray end 344. The screw feed assembly 346 may be oriented to move the fastener(s) 320 in an axial direction so as to or decouple the frame assembly 302 and the bedplate support frame 136. For example, the screw feed assembly 346 may, in an embodiment, include a rod which is threaded along its length and screwed through a support plate coupled to the second tray end 344. A first end of the rod may be coupled to the fastener(s) 320 and a torque source may be operably coupled to a second end of the rod in order to advance or retract the fastener(s) 320 axially.

Referring to FIGS. 3-5 and 9, in an embodiment, the rotor shaft 122 is coupled to the gearbox 126 via the shrink disk 146. As such, the shrink disk 146 defines a thickness ($T_D$) relative to the rotor shaft 122. Accordingly, in an embodiment, the frame assembly 302 defines a radial-separation distance (R) relative to the rotor shaft 122 which is greater than the thickness ($T_D$) defined by the shrink disk 146. The radial-separation distance (R) may permit the passage of the shrink disk 146 along the rotor shaft 122 between the frame assembly 302 and the rotor shaft 122 while the frame assembly 302 is coupled directly to the bedplate support frame 136.

In an embodiment, the frame assembly 302 may be coupled to the bedplate support frame 136 prior to the shrink disk 146 being loosened or otherwise disturbed. The frame assembly 302 may be coupled to the bedplate support frame 136 at an axial location aft of the main bearing 144 and forward of the shrink disk 146. With the frame assembly 302 secured to the bedplate support frame 136, the shrink disk 146 may be released and moved from an axial position between the frame assembly 302 and the gearbox 126 to an axial position between the main bearing 144 and the frame assembly 302. It should be appreciated that the ability to move the shrink disk 146 along the rotor shaft 122 may facilitate the addressing of certain repair procedures. For example, the shrink disk 146 may be moved forward of the frame assembly 302 in order to address a damaged rotor shaft to gearbox joint which will not separate properly. It should further be appreciated that such a requirement may not be realized until the frame assembly 302 is installed. Therefore, the radial-separation distance (R) of the frame assembly 302 may eliminate the need for the removal and subsequent reinstallation of a yoke tool upon the discovery of a damaged joint.

Referring now to FIGS. 3-5 and 9-12, in an embodiment, the clamp element(s) 310 may include a coupling face 348 and an engagement face 350 radially opposite thereof. The coupling face 348 may include at least one receiving structure 352 oriented to receive the jack element(s) 312 therein. The receiving structure(s) 352 may include a recess, a slot, a socket and/or other suitable structure which may facilitate the coupling of the clamp element(s) 310 to the jack element(s) 312. In an embodiment, a plurality of receiving structures 352 may be distributed across the coupling face 348 in order to receive a corresponding plurality of jack elements 312. For example, in an embodiment, at least two (e.g. four) receiving structures 352 may be positioned to receive a corresponding number of jack elements 312. In an embodiment, the jack element(s) 312 may be secured within the receiving structure 352 by a pin, a key, and/or a clip. Accordingly, the coupling of the clamp element(s) 310 to the jack element(s) 312 may be a removable coupling. The decoupling of the clamp element(s) 310 from the jack element(s) 312 may preclude the clamp element(s) 310 from obstructing the passageway 308 defined by the frame assembly 302, thereby facilitating the passage of the shrink disk 146 along the rotor shaft 122 while the frame assembly 302 remains coupled to the bedplate support frame 136.

In an embodiment, the engagement face 350 may be formed with a curvature generally corresponding to the radius of the rotor shaft 122. Accordingly, the engagement face 350 may distribute a clamping force to the rotor shaft 122 without developing a stress riser therein. In an embodiment, the engagement face 350 may have a curvature corresponding to the radius of a particular rotor shaft 122 of a wind turbine 100 requiring service.

Figure 10:
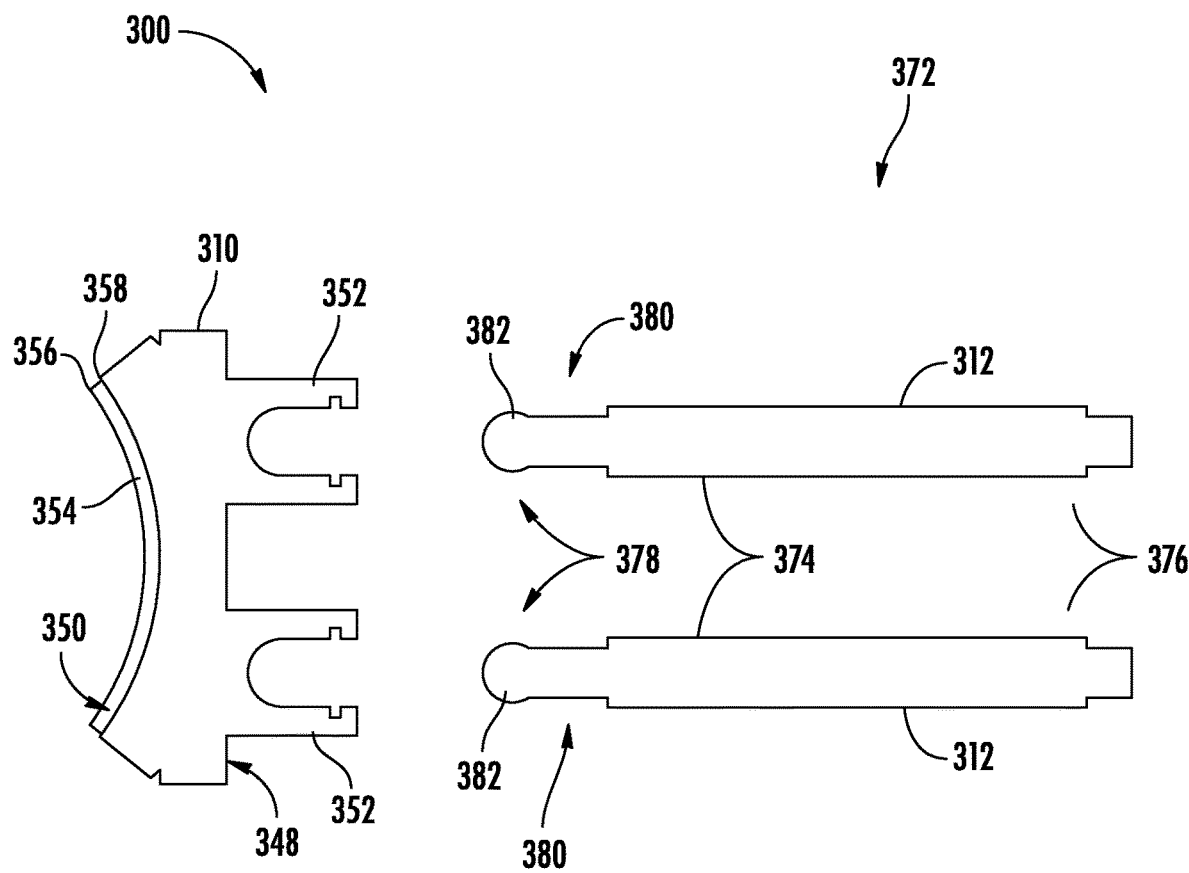
FIG. 10 illustrates a schematic view of elements of the integrated repair system according to the present disclosure.

As particularly depicted in FIG. 10, in an embodiment, the clamp element(s) 310 may include a wear layer 354 removably coupled to the engagement face 350. In an embodiment, the wear layer 354 may be a sacrificial layer. As a sacrificial layer, the wear layer 354 may be replaceable when worn or damaged. The wear layer 354 may, in an embodiment, be formed from a high-friction material so as to assist in retaining the rotor shaft 122. Further, in an embodiment, the wear layer 354 may be an adapter formed to facilitate the receiving of rotor shafts 122 of various diameters by the clamp element(s) 310. For example, as an adapter, the wear layer 354 may have an inner radial face 356 conforming to the diameter of the rotor shaft 122 and an outer radial face 358 conforming to the curvature of the engagement face 350. It should be appreciated that the ability to receive rotor shafts 122 of varying diameters may facilitate the utilization of the system 300 to service a variety of different wind turbine models.

Referring now to FIG. 12, in an embodiment, the clamp element(s) 310 may encircle the rotor shaft 122. For example, in an embodiment, the clamp element (s) may be a clamshell ring. In such an embodiment, the clamp element(s) 310 may include a first clamshell portion 360 and a second clamshell portion 362. The first and second clamshell portions 360, 362 may be pivotably coupled to one another. As a clamshell ring, the clamp element(s) 310 may completely encircle the rotor shaft 122 so as to secure the rotor shaft 122 therein.

Referring again to FIGS. 3-5 and 9-12, in an embodiment, the clamp element(s) 310 may be supported by the jack element(s) 312. The jack element(s) 312 may be configured to move in a radial direction relative to the frame assembly 302. Accordingly, the jack element(s) 312 may move the clamp element(s) 310 in a radial direction between the frame assembly 302 and the rotor shaft 122. In other words, the jack element(s) 312 may, in an embodiment, advance the clamp element(s) 310 inward of the frame assembly 302 in the direction of the axis (A) of the rotor 112.

Figure 11:
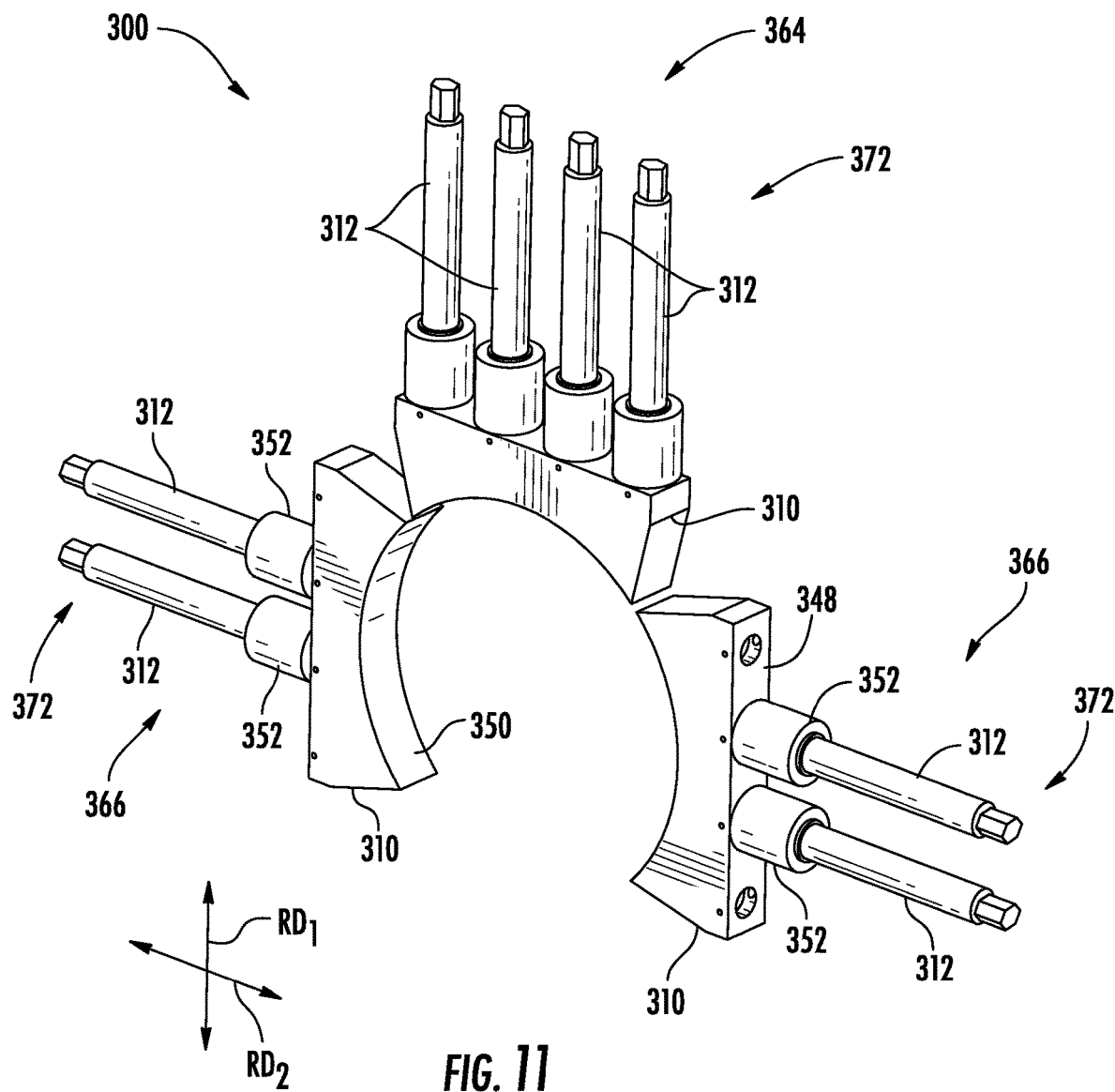
FIG. 11 illustrates a schematic view of elements of the integrated repair system according to the present disclosure.

As depicted in FIGS. 9, 11, and 12, in an embodiment, the system 300 may include at least a first jack element 364 movable in a first radial direction ($RD_1$). The system 300 may, in an embodiment, include at least a second jack element 366 movable in a second radial direction ($RD_2$). The second radial direction ($RD_2$) may be offset from the first radial direction ($RD_1$) by at least 90 degrees. In an embodiment, the first jack element(s) 364 may transfer essentially all of the upward vertical load ($L_2$) to the frame assembly 302. Additionally, in an embodiment, the second jack element(s) 366 may exert a lateral force on the rotor shaft 122.

In an embodiment, the first jack element(s) 364 and the second jack element(s) 366 may be employed to affect an alignment of the rotor shaft 122. Accordingly, the system 300 may facilitate a rotor shaft repositioning. For example, during certain repair procedures, such as a gearbox removal or installation, it may be necessary to adjust a vertical or lateral main shaft position, such as may be required to release or engage various gearbox mounting components. By employing the system 300, an end of the rotor shaft 122 may be moved vertically by the radial movements of the first jack element(s) 364 and may be moved laterally by the radial movements of the second jack element(s) 366. In an embodiment, this movement or alignment of the rotor shaft 122 may be accomplished while the frame assembly 302 supports the upward vertical load ($L_2$).

Referring still to FIG. 12, in an embodiment, the jack element(s) 312 may be a hydraulic actuator 370. A portion of the hydraulic actuator 370 may be received within a jack mounting point 368 of the frame assembly 302.

Referring again to FIGS. 10 and 11, in an embodiment, the jack element(s) 312 may be a jackscrew 372. The jackscrew 372 may be a linear actuator having a threaded stud 374 (e.g., a screw shaft) extending between a first stud end 376 and a second stud end 378. The threaded stud 374 may be received by the corresponding jack mounting point 368 of the frame assembly 302. In embodiment, the first stud end 376 may be an engagement portion having a structure for receiving an applied torque. The second stud end 378 may define a retention feature 380 and a rounded foot 382 (e.g. a spherical foot) receivable by a corresponding socket 352 of the clamp element(s) 310. In an embodiment, the retention feature 380 may be a region of reduced diameter (e.g., a groove or a neck) formed so as to interface with the pin, key, and/or clip in order to secure the second stud end 378 in the receiving structure 352. The rounded foot 382 may permit a degree of movement between the clamp element(s) 310 and the jack element(s) 312 so as to facilitate an alignment of the clamp element(s) 310 with the rotor shaft 122. It should be appreciated that the combination of the retention feature 380 and the receiving structure 352 may facilitate the rapid removal of the clamp element(s) 310 in order to remove obstructions from the passageway 308.

Referring now to FIGS. 5 and 9, in an embodiment, the system 300 may be configured to counter a downward force ($L_3$) on the rotor shaft 122 opposite the rotor 108. For example, in response to a wind event, the rotor 108 may develop a moment about the main bearing 144 which is opposite of the moment, and subsequent upward vertical load ($L_2$), resulting from the weight of the rotor 108. As such, in an embodiment, the system 300 may include a suspension strap 384. The suspension strap 384 may be coupled to the frame assembly 302 and may pass between the rotor shaft 122 and the bedplate support frame 136.

In an additional embodiment, the second radial direction ($RD_2$) may be oriented so that the second jack element(s) 366 may exert both a vertical and a lateral force on the rotor shaft 122 as required. In such an embodiment, the second jack element(s) 366 may be positioned to resist the downward force ($L_3$) and to provide a lateral movement to the rotor shaft 122. For example, in an embodiment, at least three jack elements 312 may be circumferentially offset from one another by 120 degrees. It should be appreciated that the utilization of the second jack, 366 to provide both vertical and lateral support may preclude the requirement for the suspension strap 384, thereby reducing the cost and complexity of the system 300.

Referring again to FIGS. 3 and 4, in an embodiment, the system 300 may include at least one push element 386 having a first end 388 received in a recess defined by the frame assembly 302. The push element(s) 386 may also include a second end 390 oriented to exert an axial force upon the gearbox 126. For example, the push element(s) 386 may be a hydraulic cylinder which may exert an axial force on the gearbox 126 in order to separate the gearbox 126 from the rotor shaft 122 following the loosening of the shrink disk 146. It should be appreciated that reacting off of the frame assembly 302 may facilitate the utilization of shorter hydraulic cylinders than would be required to react off of a component of the wind turbine 100, such as the main bearing 144. The utilization of shorter hydraulic cylinders may facilitate technician access and ergonomics when servicing the component.

Referring still to FIG. 4 and also to FIG. 12, in an embodiment, the system 300 may include an axial support element 392. The axial support element 392 may have a first end 394 coupled to the frame assembly 302. The axial support element 392 may, in an embodiment, also include a second end 396 positioned to react off of a gearbox support system 398. In an embodiment, the axial support element 392 may be a threaded stud which may be retractable. The axial support element 392 may be positioned to counter a rotational movement of the frame assembly 302 in response to the upward vertical load ($L_2$).

Figure 13:
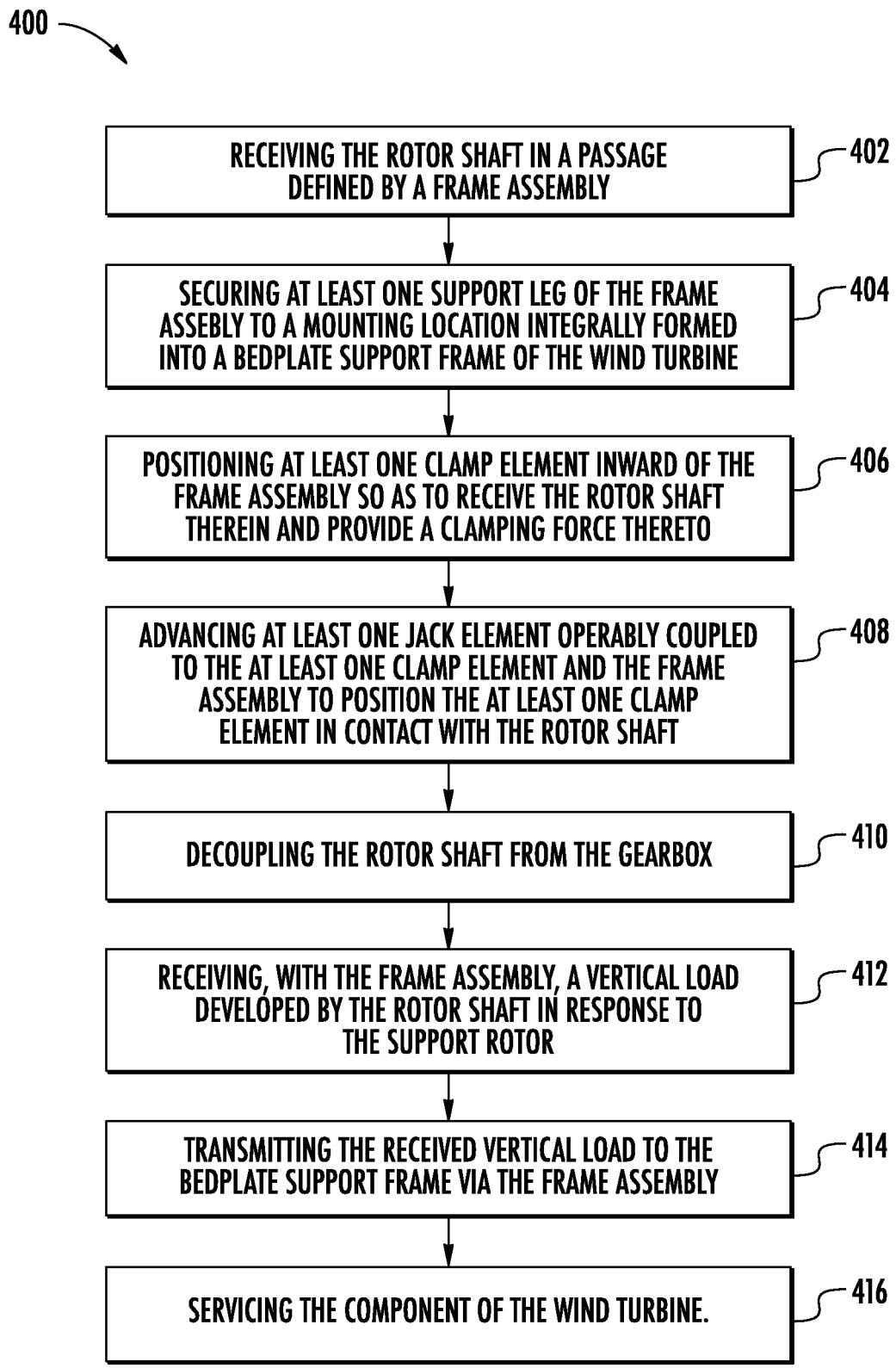
FIG. 13 illustrates a flow diagram of one embodiment of a method for servicing a component within a nacelle of the wind turbine uptower according to the present disclosure.

Referring to FIG. 13, a flow diagram of one embodiment of a method 400 for servicing a component within a nacelle of a wind turbine uptower is illustrated. The method 400 may be implemented using, for instance, the integrated repair system 300 discussed above with reference to FIGS. 1-12. FIG. 13 depicts steps performed in a particular order for purposes of illustration and discussion. Those of ordinary skill in the art, using the disclosures provided herein, will understand that various steps of the method 400 or any of the other methods disclosed herein may be adapted, modified, rearranged, performed simultaneously or modified in various ways without deviating from the scope of the present disclosure.

As shown at (402), the method 400 includes receiving the rotor shaft and a passage defined by a frame assembly. As shown at (404), the method 400 includes securing at least one support leg of a frame assembly to a mounting location integrally formed into a bedplate support frame of the wind turbine. As shown at (406), the method 400 includes positioning at least one clamp element inward of the frame assembly so as to receive the rotor shaft therein and provide a clamping force thereto. As shown at (408), the method 400 includes advancing at least one jack element operably coupled to the at least one clamp element and the frame assembly to position the at least one clamp element in contact with the rotor shaft. As shown at (410), the method 400 includes decoupling the rotor shaft from the gearbox. As shown at (412), the method 400 includes receiving, with the frame assembly, a vertical load developed by the rotor shaft in response to the supported rotor. As shown at (414), the method 400 includes transmitting the received vertical load to the bedplate support frame via the frame assembly. Additionally, as shown at (416), the method 400 includes servicing the component of the wind turbine.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

For reasons of completeness, various aspects of the present disclosure are set out in the following numbered clauses:

Clause 1. An integrated repair system for servicing a component within a nacelle of a wind turbine uptower, the wind turbine having a rotor with at least one rotor blade mounted to a rotatable hub, the rotor operably coupled to a gearbox via a rotor shaft supported by at least one main bearing, the repair system comprising: at least one mounting location integrally formed into a bedplate support frame of the wind turbine; a frame assembly comprising at least one support leg secured to the mounting location and defining a passageway that receives the rotor shaft therethrough; at least one clamp element positioned inward of the frame assembly so as to receive the rotor shaft therein and provide a clamping force thereto; and at least one jack element engaged with the frame assembly and the at least one clamp element, the at least one jack element being operable with the frame assembly to provide support to and movement of the rotor shaft in at least one direction, wherein, when the gearbox is moved in the nacelle during a repair procedure, the repair system supports the main shaft uptower such that the rotor remains installed onto the rotor shaft.

Clause 2. The repair system of clause 1, wherein the rotor shaft is coupled to the gearbox via a shrink disk, the shrink disk defining a thickness relative to the rotor shaft, wherein the frame assembly defines a radial-separation distance relative to the rotor shaft which is greater than the thickness defined by the shrink disk, the radial-separation distance permitting the passage of the shrink disk along the rotor shaft between the frame assembly and the rotor shaft while the frame assembly is coupled to the bedplate support frame.

Clause 3. The repair system of any preceding clause, wherein the at least one jack element is at least a first jack element movable in a first radial direction, the repair system further comprising at least a second jack element engaged with the frame assembly, the second jack element being movable in a second radial direction, the second radial direction being offset from the first radial direction by at least 90 degrees.

Clause 4. The repair system any preceding clause, wherein the at least one jack element comprises a hydraulic actuator or a screw jack, the screw jack comprising a threaded stud extending between a first stud end and a second stud end, the second stud end defining a retention feature and a rounded foot receivable by a corresponding socket of the clamp element.

Clause 5. The repair system of any preceding clause, wherein the at least one clamp element further comprising a removable wear layer.

Clause 6. The repair system of any preceding clause, wherein the at least one mounting location comprises a web of the bedplate support frame having at least one boss, the at least one boss defining a through hole having a diameter corresponding to a diameter of at least one fastener, and wherein a coupling portion of the at least one support leg comprises an interface comprising a first portion positioned at a first axial position and a second portion positioned at a second axial position, a distance between the first axial position and the second axial position corresponding to a thickness of the at least one mounting location, the first and second portions each defining the through hole for receiving the at least one fastener.

Clause 7. The repair system of any preceding clause, wherein the at least one mounting location further comprises at least one reinforcing strut oriented to accept a maximal load developed by the rotor in response to a wind event.

Clause 8. The repair system of any preceding clause, further comprising at least one tensioning-jack element engaged with the frame assembly and oriented to press against the bedplate support frame in order to secure the at least one fastener within the through hole defined by the at least mounting location and the interface.

Clause 9. The repair system of any preceding clause, wherein the at least one mounting location comprises a mounting surface having a contour corresponding to a contour of the support leg, the mounting surface defining a plurality of fastener openings for receiving a plurality of threaded fasteners, the plurality of threaded fasteners being configured within the corresponding plurality of fastener openings.

Clause 10. The repair system of any preceding clause, further comprising: a pin carrier tray having a support surface extending between a first tray end and a second tray end, the first tray end being removably coupled to the at least one support leg; and a screw feed assembly operably coupled to the second tray end and oriented to move the at least one fastener in an axial direction so as to couple or decouple the frame assembly and the bedplate support frame.

Clause 11. The repair system of any preceding clause, further comprising: a suspension strap coupled to the frame assembly and configured to pass between the rotor shaft and the bedplate support frame so as to counter a downward force on the rotor shaft.

Clause 12. The repair system of any preceding clause, further comprising: at least one gearbox-push element, the gearbox-push element having a first end received in a recess defined by the frame assembly and a second end oriented to exert an axial force upon the gearbox.

Clause 13. The repair system of any preceding clause, further comprising: an axial support element having a first end coupled to the frame assembly and a second end positioned to react off of a gearbox support system.

Clause 14. A method for servicing a component within a nacelle of a wind turbine uptower, the wind turbine having a rotor with at least one rotor blade mounted to a rotatable hub, the rotor being operably coupled to a gearbox via a rotor shaft supported by at least one main bearing, the method comprising: receiving the rotor shaft in a passage defined by a frame assembly; securing at least one support leg of the frame assembly to a mounting location integrally formed into a bedplate support frame of the wind turbine; positioning at least one clamp element inward of the frame assembly so as to receive the rotor shaft therein and provide a clamping force thereto; advancing at least one jack element operably coupled to the at least one clamp element and the frame assembly to position the at least one clamp element in contact with the rotor shaft; decoupling the rotor shaft from the gearbox; receiving, with the frame assembly, a vertical load developed by the rotor shaft in response to the supported rotor; transmitting the received vertical load to the bedplate support frame via the frame assembly; and servicing the component of the wind turbine.

Clause 15. The method of any preceding clause, wherein the wind turbine further comprises a shrink disk circumscribing the rotor shaft, the shrink disk defining a thickness relative to the rotor shaft which is greater than an outer diameter of the rotor shaft, the method further comprising: passing the shrink disk along the rotor shaft between the rotor shaft and the frame assembly while the frame assembly is coupled to the bedplate support frame.

Clause 16. The method of any preceding clause, further comprising: conforming the at least one clamp element to an outer diameter of the rotor shaft by coupling a removable wear layer to the at least one clamp element.

Clause 17. The method of any preceding clause, wherein the at least one mounting location comprises a web of the bedplate support frame having at least one boss, the at least one boss defining a through hole having a diameter corresponding to a diameter of at least one fastener, and wherein securing the at least one support leg to the mounting location further comprises: engaging the web with a coupling portion of the at least one support leg, wherein the coupling portion comprises an interface comprising: a first portion positioned at a first axial position, and a second portion positioned at a second axial position, the first and second portions each further defining the through hole for receiving the at least one fastener; and inserting the at least one fastener into the through hole so as to secure the web of the bedplate support frame within the interface.

Clause 18. The method of any preceding clause, further comprising: moving an end of the rotor shaft in a radial direction by advancing or retracting the at least one jack element.

Clause 19. The method of any preceding clause, further comprising:
passing a suspension strap between the rotor shaft and the bedplate support frame; coupling the suspension strap to the frame assembly; developing a downward force on an end of the rotor shaft opposite the rotor in response to a wind event impacting the rotor; and receiving the downward force of the end of the rotor shaft with the suspension strap.

Clause 20. A wind turbine, comprising: a tower; a nacelle mounted atop the tower; a rotor mounted to the nacelle, the rotor comprising a rotatable hub having one or more rotor blades secured thereto; a rotor shaft operably coupling the rotor to a gearbox positioned within the nacelle; at least one main bearing supporting the rotor shaft; a bedplate support frame positioned within the nacelle and supporting the main bearing and the gearbox; and an integrated repair system for servicing a component within the nacelle, the repair system comprising: at least one mounting location integrally formed into a bedplate support frame of the wind turbine, a frame assembly comprising at least one support leg secured to the mounting location and defining a passageway that receives the rotor shaft therethrough, at least one clamp element positioned inward of the frame assembly so as to receive the rotor shaft therein and provide a clamping force thereto, and at least one jack element engaged with the frame assembly and the at least one clamp element, the at least one jack element being operable with the at least one frame assembly to provide support to and movement of the rotor shaft in at least one direction, wherein, when the gearbox is moved in the nacelle during a repair procedure, the repair system supports the main shaft uptower such that the rotor remains installed onto the rotatable hub.

What is claimed is:

1. An integrated repair system for servicing a component within a nacelle of a wind turbine uptower, the wind turbine having a rotor with at least one rotor blade mounted to a rotatable hub, the rotor operably coupled to a gearbox via a rotor shaft, the repair system comprising:
    at least one mounting location integrally formed into a bedplate support frame of the wind turbine;
    a frame assembly comprising at least one support leg secured to the mounting location and defining a passageway that receives the rotor shaft therethrough;
    a pin carrier tray having a support surface extending between a first tray end and a second tray end, the first tray end being removably coupled to the at least one support leg;
    a screw feed assembly operably coupled to the second tray end and oriented to move at least one fastener in an axial direction so as to couple or decouple the frame assembly and the bedplate support frame;
    at least one clamp element positioned inward of the frame assembly so as to receive the rotor shaft therein and provide a clamping force thereto; and
    at least one jack element engaged with the frame assembly and the at least one clamp element, the at least one jack element being operable with the frame assembly to provide support to and movement of the rotor shaft in at least one direction,
    wherein, when the gearbox is moved in the nacelle during a repair procedure, the repair system supports the rotor shaft uptower such that the rotor remains installed onto the rotor shaft.

2. The repair system of claim 1, wherein the rotor shaft is coupled to the gearbox via a shrink disk, the shrink disk defining a thickness relative to the rotor shaft, wherein the frame assembly defines a radial-separation distance relative to the rotor shaft which is greater than the thickness defined by the shrink disk, the radial-separation distance permitting the passage of the shrink disk along the rotor shaft between the frame assembly and the rotor shaft while the frame assembly is coupled to the bedplate support frame.

3. The repair system of claim 1, wherein the at least one jack element is at least a first jack element movable in a first radial direction, the repair system further comprising at least a second jack element engaged with the frame assembly, the second jack element being movable in a second radial direction, the second radial direction being offset from the first radial direction by at least 90 degrees.

4. The repair system of claim 1, wherein the at least one jack element comprises a hydraulic actuator or a screw jack, the screw jack comprising a threaded stud extending between a first stud end and a second stud end, the second stud end defining a retention feature and a rounded foot receivable by a corresponding socket of the clamp element.

5. The repair system of claim 1, wherein the at least one clamp element further comprising a removable wear layer.

6. The repair system of claim 1, wherein the at least one mounting location comprises a web of the bedplate support frame having at least one boss, the at least one boss defining a through hole having a diameter corresponding to a diameter of the at least one fastener, and wherein a coupling portion of the at least one support leg comprises an interface comprising a first portion positioned at a first axial position and a second portion positioned at a second axial position, a distance between the first axial position and the second axial position corresponding to a thickness of the at least one mounting location, the first and second portions each defining the through hole for receiving the at least one fastener.

7. The repair system of claim 6, wherein the at least one mounting location further comprises at least one reinforcing strut oriented to accept a maximal load developed by the rotor in response to a wind event.

8. The repair system of claim 6, further comprising at least one tensioning-jack element engaged with the frame assembly and oriented to press against the bedplate support frame in order to secure the at least one fastener within the through hole defined by the at least mounting location and the interface.

9. The repair system of claim 1, wherein the at least one mounting location comprises a mounting surface having a contour corresponding to a contour of the support leg, the mounting surface defining a plurality of fastener openings for receiving a plurality of threaded fasteners, the plurality of threaded fasteners being configured within the corresponding plurality of fastener openings.

10. The repair system of claim 1, further comprising:
a suspension strap coupled to the frame assembly and configured to pass between the rotor shaft and the bedplate support frame so as to counter a downward force on the rotor shaft.

11. The repair system of claim 1, further comprising:
at least one gearbox-push element, the gearbox-push element having a first end received in a recess defined by the frame assembly and a second end oriented to exert an axial force upon the gearbox.

12. The repair system of claim 1, further comprising:
an axial support element having a first end coupled to the frame assembly and a second end positioned to react off of a gearbox support system.

13. A method for servicing a component within a nacelle of a wind turbine uptower, the wind turbine having a rotor with at least one rotor blade mounted to a rotatable hub, the rotor being operably coupled to a gearbox via a rotor shaft, the method comprising:
receiving the rotor shaft in a passage defined by a frame assembly;
securing at least one support leg of the frame assembly to a mounting location integrally formed into a bedplate support frame of the wind turbine, the at least one mounting location being a web of the bedplate support frame having at least one boss, the at least one boss defining a through hole having a diameter corresponding to a diameter of at least one fastener, wherein securing the at least one support leg of the frame assembly to the mounting location further comprises:
engaging the web with a coupling portion of the at least one support leg, wherein the coupling portion comprises an interface comprising a first portion positioned at a first axial position and a second portion positioned at a second axial position, the first and second portions each further defining the through hole for receiving the at least one fastener; and
inserting the at least one fastener into the through hole so as to secure the web of the bedplate support frame within the interface;
positioning at least one clamp element inward of the frame assembly so as to receive the rotor shaft therein and provide a clamping force thereto;
advancing at least one jack element operably coupled to the at least one clamp element and the frame assembly to position the at least one clamp element in contact with the rotor shaft;
decoupling the rotor shaft from the gearbox;
receiving, with the frame assembly, a vertical load developed by the rotor shaft in response to the supported rotor;
transmitting the received vertical load to the bedplate support frame via the frame assembly; and
servicing the component of the wind turbine.

14. The method of claim 13, wherein the wind turbine further comprises a shrink disk circumscribing the rotor shaft, the shrink disk defining a thickness relative to the rotor shaft which is greater than an outer diameter of the rotor shaft, the method further comprising:
passing the shrink disk along the rotor shaft between the rotor shaft and the frame assembly while the frame assembly is coupled to the bedplate support frame.

15. The method of claim 13, further comprising:
conforming the at least one clamp element to an outer diameter of the rotor shaft by coupling a removable wear layer to the at least one clamp element.

16. The method of claim 13, further comprising:
moving an end of the rotor shaft in a radial direction by advancing or retracting the at least one jack element.

17. The method of claim 13, further comprising:
passing a suspension strap between the rotor shaft and the bedplate support frame;
coupling the suspension strap to the frame assembly;
developing a downward force on an end of the rotor shaft opposite the rotor in response to a wind event impacting the rotor; and
receiving the downward force of the end of the rotor shaft with the suspension strap.

18. A wind turbine, comprising:
a tower;
a nacelle mounted atop the tower;
a rotor mounted to the nacelle, the rotor comprising a rotatable hub having one or more rotor blades secured thereto;
a rotor shaft operably coupling the rotor to a gearbox positioned within the nacelle;
a bedplate support frame positioned within the nacelle and supporting the gearbox; and an integrated repair system for servicing a component within the nacelle, the repair system comprising:
a frame assembly comprising at least one support leg secured to a mounting location and defining a passageway that receives the rotor shaft therethrough, wherein the at least one mounting location is integrally formed into the bedplate support frame of the wind turbine, the at least one mounting location comprising a web of the bedplate support frame having at least one boss, the at least one boss defining a through hole having a diameter corresponding to a diameter of at least one fastener, and wherein a coupling portion of the at least one support leg comprises an interface comprising a first portion positioned at a first axial position and a second portion positioned at a second axial position, a distance between the first axial position and the second axial position corresponding to a thickness of the at least one mounting location, the first and second portions each defining the through hole for receiving the at least one fastener,
at least one clamp element positioned inward of the frame assembly so as to receive the rotor shaft therein and provide a clamping force thereto, and
at least one jack element engaged with the frame assembly and the at least one clamp element, the at least one jack element being operable with the at least one frame assembly to provide support to and movement of the rotor shaft in at least one direction, wherein, when the gearbox is moved in the nacelle during a repair procedure, the repair system supports the main shaft uptower such that the rotor remains installed onto the rotatable hub.

\* \* \* \* \*